Figure 1:
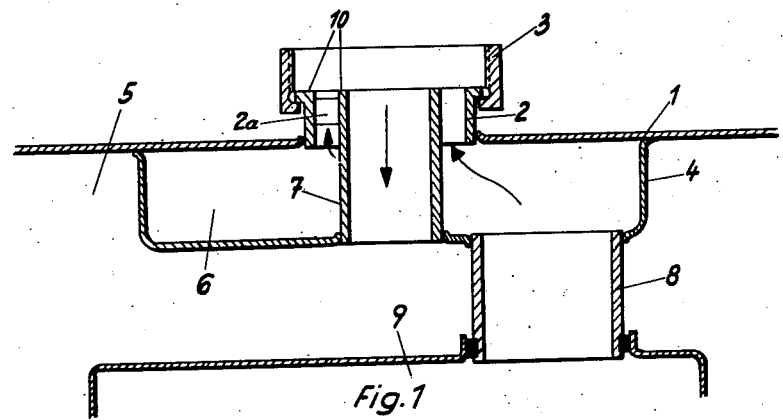

July 16, 1957          F. RINGS          2,799,166

GAS METER IN COMBINATION WITH A PIPE LINE CONNECTOR PIECE

Filed July 28, 1954          2 Sheets-Sheet 1

Inventor:
Franz Rings
By:
Jones, Darby & Robertson Attys.

July 16, 1957 F. RINGS 2,799,166
GAS METER IN COMBINATION WITH A PIPE LINE CONNECTOR PIECE
Filed July 28, 1954 2 Sheets-Sheet 2

Inventor:
Franz Rings
By:-
Jones, Darby & Robertson
Attys.

United States Patent Office 2,799,166
Patented July 16, 1957

2,799,166

GAS METER IN COMBINATION WITH A PIPE LINE CONNECTOR PIECE

Franz Rings, Nahne, near Osnabruck, Germany, assignor to G. Kromschröder Aktiengesellschaft, Osnabruck, Germany Application July 28, 1954, Serial No. 446,208

6 Claims. (Cl. 73—274)

This invention relates generally to means for connecting fluid handling devices to pipe lines and is more particularly concerned with the means mounted on and within such devices for connection to a pipe line connector piece.

A pipe line connector piece, with which this invention is concerned, is built into the supply and discharge pipe of a conduit system for a flowing medium. Such a connector piece has a double connector socket in which the supply and discharge conduits lie concentrically within one another. Such a pipe line connector piece can be used for the connection of various fluid handling devices, provided that the device to be connected with it, too, has a double connector socket with the inlet and outlet openings arranged concentrically to one another.

The present invention relates to a construction of a gas meter, preferably of a slide controlled dry gas meter, which can be connected to such a pipe line connector piece with double connector socket. The invention has the object of allowing such a connection without altering the structure of the gas meter, and particularly the meter mechanisim thereof.

Gas meters of the usual construction have, as well known, a sheet metal casing from the top of which two connector sockets project at a more or less large distance from one another. In contradistinction the invention herein consists in that the connector socket of the gas meter is composed of two concentrical tubular sockets inserted in the plane of symmetry into the meter casing, one of which issues into the interior of the casing, while the other one is connected to the discharge manifold by means of a connector piece. By means of such a double connector socket arranged symmetrically on the meter casing the meter can be screwed to the pipe line connector piece in any orientation (relative angle) desired, e. g. by means of a ring nut. With a suspended gas meter a more uniform distribution of weight is attained in addition to a more pleasing appearance.

A particularly simple and convenient arrangement results when the inner tubular socket is connected to the outlet manifold by a connector piece.

Such a connector piece can be arranged easily in such a manner, that it issues between the control slides into the outlet mainfold, so that the attachment of the connector piece does not make an enlargement of the meter machanism necessary. Even the shaft of the control machanism crank can be journalled in the connector piece, and thus additional bearing blocks can be dispensed with, which has been hitherto usual.

Figure 2:
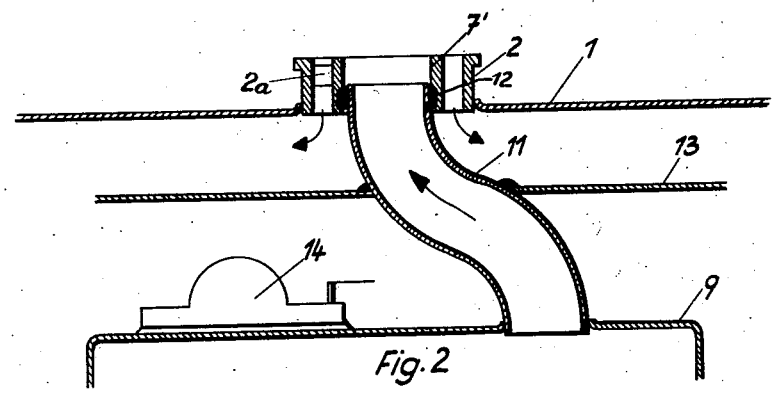
Figure 3:
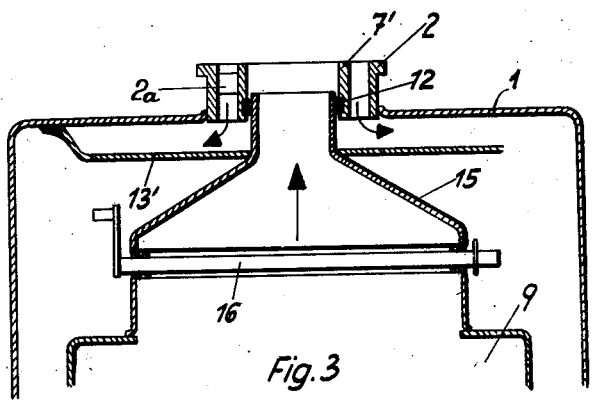
Figure 4:
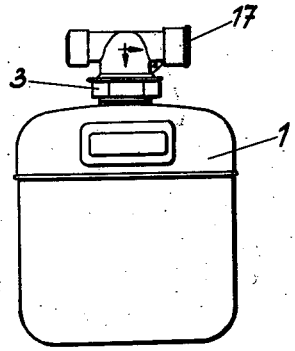
Figure 5:
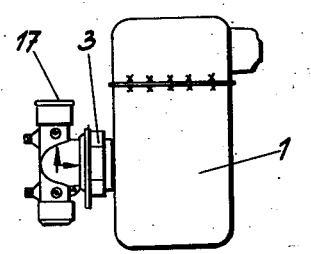
Figure 6:
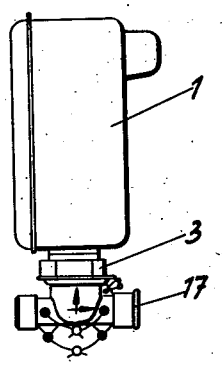

In the accompanying drawings,

Figs. 1, 2 and 3 are cross-sectional views of the terminal portions of gas meters showing three different embodiments of the invention, and Figs. 4, 5 and 6 are elevation views illustrating three different connecting arrangements that may be employed with the gas meters.

Into the wall 1 of a gas meter casing a tubular snout 2 is soldered in the plane of symmetry thereof, which socket holds a ring nut 3. A space 6 is formed by a box shaped sheet metal component 4, which is arranged below the tubular snout 2 on the wall 1 of the casing, which space 6 is closed against the interior 5 of the casing. A tubular element 7 carried by the sheet metal component 4 and lying concentrically to the tubular snout 2 issues into the interior 5 of the casing after penetrating through the space 6. The tubular element 7 is spacedly positioned within snout 2 by struts 2a. Three of such struts may conveniently be employed. The space 6 is in communication with the outlet manifold 9 of the meter mechanism (not shown) through a connector piece 8. The concentrical tubular snout 2, and tubular element 7 end in a common sealing face 10.

The double connector socket 2, 7 is screwed by the ring nut to the pipe line connector socket (not shown). The gas enters in the direction of the arrow through the inner tubular element 7 into the interior 5 of the casing, and leaves the meter, after being metered, through the connector piece 8, the space 6 and the outer tubular snout 2. The flow resistance of the meter is not increased by the concentrical arrangement of the inlet and outlet conduits.

In the embodiment illustrated in Figure 2 the inner tubular element 7' is in communication with the outlet mainfold 9 through an S-shaped connector piece 11, which is inserted gas tight by means of a squeezed packing 12. On the connector piece 11 a baffle plate 13 is attached which screens the meter mechanism. The gas which here flows in through the outer tubular snout 2 impinges on the baffle plate 13 and is prevented by the same (13) from depositing dust and other impurities on the control mechanism 14 of the meter mechanism.

In the embodiment illustrated in Figure 3 between the outlet manifold 9 and the inner tubular element 7' a hood shaped connecting piece 15 is arranged, which is sealed between the two usual shell slides of the metering mechanism (not shown). A baffle plate 13' is here attached on the casing wall 1, and is penetrated by the connector piece 15.

In the connector piece 15 the crank shaft 16 of the slide control is journalled and passed through in a gas tight manner, so that the usual bearing blocks can be dispensed with.

Normally the double connector socket is arranged on top in the middle of the meter casing 1 as represented in Figure 4, so that the meter can be screwed, in a suspended position, in any orientation desired, to the pipe line connector piece 17.

However, the double connector socket could be alternatively arranged in an appropriate manner on the back (see Figure 5) or on the bottom (see Figure 6) of the meter casing, when the spatial conditions make this necessary.

What I claim is:

1. In a gas meter having a metal housing having a circular connection opening therein and a discharge manifold arranged within said housing and having a discharge opening therein, an open-ended tubular snout fixed within said housing at said connection opening, a tubular element coaxial with said snout and defining concentric central and annular conduits passing through said housing at said connection opening, and means connecting said discharge opening with one of said conduits, the other of said conduits opening into the space within said housing.

2. Structure in accordance with claim 1 wherein the discharge opening in the discharge manifold is connected with the annular conduit, and the means connecting said discharge opening with said conduit comprises means forming a discharge chamber within the housing at the connection opening therein and surrounding the same and a tube connecting said discharge opening with said chamber, the tubular element at said connection opening extending through said chamber to open into the space within said housing.

3. Structure in accordance with claim 1 wherein the discharge opening in the discharge manifold is connected with the central conduit by means of a tube and including a baffle mounted on said tube spaced from the housing at the connection opening and extending radially outwardly from said tube.

4. In a gas meter having a metal housing having a circular connection opening at the top thereof, a discharge manifold arranged within said housing and having a discharge opening therein, and a meter mechanism control slide crank; an open-ended tubular snout fixed within said housing at said connection opening; a tubular element coaxial with said snout and defining concentric central and annular conduits passing through said housing at said connection opening; said tubular element extending downwardly to connect with said discharge opening; said crank being journalled in said tubular element; said annular conduit opening into the space within said housing.

5. Structure in accordance with claim 4 wherein the tubular element is flared to provide a lower portion of greater width than the diameter of said element at the connection opening; the crank being journalled in said lower portion.

6. Structure in accordance with claim 4 and including a baffle mounted on said tubular element spaced from the top of the housing and extending radially outwardly from the tubular element.

References Cited in the file of this patent

UNITED STATES PATENTS 587,125 Kennedy _____ July 27, 1897

FOREIGN PATENTS 383,820 Germany _____ Oct. 18, 1923